J. F. TRUST.
TROLLEY POLE WHEEL.
APPLICATION FILED AUG. 3, 1916.
1,220,800.
Patented Mar. 27, 1917.
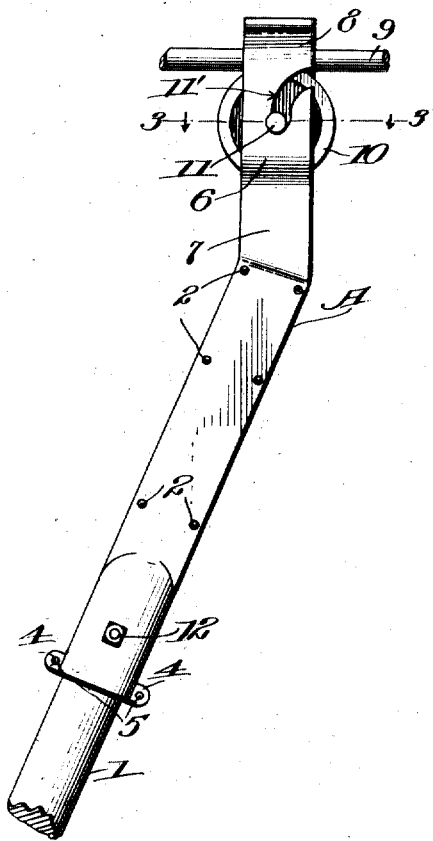
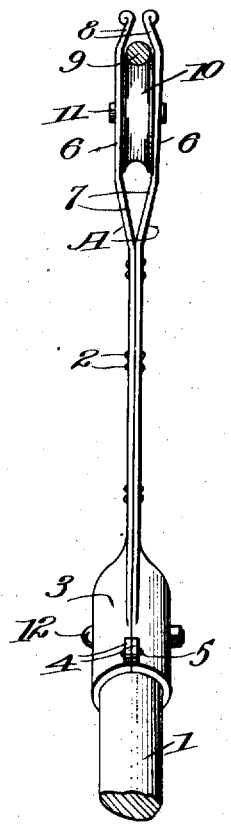
Inventor,
J. F. Trust.
By Frank Fuller
Attorney

UNITED STATES PATENT OFFICE.

JOHN F. TRUST, OF HAGERSTOWN, MARYLAND.

TROLLEY-POLE WHEEL.

1,220,800. Specification of Letters Patent. Patented Mar. 27, 1917.

Application filed August 3, 1916. Serial No. 113,007.

*To all whom it may concern:*

Be it known that I, JOHN F. TRUST, a citizen of the United States, residing at Hagerstown, in the county of Washington and State of Maryland, have invented certain new and useful Improvements in Trolley-Pole Wheels, of which the following is a specification.

My invention relates to an improved trolley pole and has among its important objects, the provision of an improved means whereby the trolley wire is prevented from disengaging the pole during travel of the car and especially when rounding curves or traveling on an incline; to provide a novel form of means to detachably mount the trolley wheel; to provide a novel means to permit swaying of the pole without dislodging the wire, and to provide the novel improved and simplified specific construction hereinafter described and illustrated in accompanying drawings, wherein:—

Figure 1 is a fragmentary side elevation of a trolley pole involving my improvements; Fig. 2 is a side elevation of the parts of Fig. 1, and Fig. 3 is a cross sectional view taken substantially on the line 3—3 of Fig. 1.

Referring specifically to the drawings, 1 designates an ordinary pole, for instance, one constructed of wood as usual. As my improvement, two similar plates or strips A are provided being preferably riveted or otherwise connected together at 2 so as to provide a yielding portion. At one end the plates 2 are concavely formed to provide a thimble at 3 to receive the upper end of the pole 1. The sections of thimble 3 preferably have lugs 4 integral therewith and riveted or otherwise fastened together at 5.

At the other end, arms A are formed into bearings 6 separated from each other by outwardly deflected portions 7. Bearings 6, at their free ends, are deflected inwardly at 8 so as to have less space between them than the diameter of the trolley wire which is shown at 9. The trolley wheel is shown at 10 disposed intermediate the bearings and with a shaft 11 thereof disposed in substantially arcuate slots 11' provided in the bearings.

With my construction, the intermediate portions of arms A joined by the rivets 2 enable movement of the wheel 10 relatively to the pole 1, or in other words, swaying, of the wheel with the wire 9 without detachment therefrom.

Further, the slots 11 removably mount the wheel 10 at its shaft 11 and due to the inward deflection of the bearings at 8, the wheel is mounted against accidental detachment. However, the bearings may be spread by a suitable instrument to facilitate insertion or removal of the wheel 10 and wire 9. Further, the deflected portions 8 prevent accidental disengagement of the wire 9 from the wheel 10 and from the trolley pole.

If desired, a bolt 12 may be passed through the thimble pole 3 and pole 1. Also other changes in the details of construction may be resorted to within the spirit and scope of the invention as defined by appended claims.

I claim:

1. In combination with a trolley pole, a supplemental pole device comprising a plurality of plates, means to connect the plates intermediate their ends to provide a laterally yieldable portion, said plates adjacent one end forming a thimble receiving said pole, and said plates adjacent their other ends being yieldable relatively, a trolley wheel intermediate said plates, means of said plates removably supporting said wheel, and one of said plates being deflected inwardly to prevent accidental displacement of said wheel.

2. A trolley pole having a plurality of bearings, said bearings being deflected outwardly to provide a space, each of said bearings being yieldable relatively and having a slot therein, a wheel disposed intermediate said bearings and in said space, shaft means of said wheel entering said slots, and said arms being extended inwardly adjacent their upper ends to prevent accidental displacement of the wheel and of the trolley wire in engagement therewith.

In testimony whereof I affix my signature in the presence of two witnesses.

JOHN F. TRUST.

Witnesses:
C. L. BURGISSER,
JOHN D. TURNER.